(12) United States Patent
Yi

(10) Patent No.: US 11,948,081 B2
(45) Date of Patent: Apr. 2, 2024

(54) IMAGE RECOGNITION METHOD AND COMPUTING DEVICE

(71) Applicant: HON HAI PRECISION INDUSTRY CO., LTD., New Taipei (TW)

(72) Inventor: Ren-Shan Yi, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 413 days.

(21) Appl. No.: 17/195,891

(22) Filed: Mar. 9, 2021

(65) Prior Publication Data

US 2021/0374471 A1    Dec. 2, 2021

(30) Foreign Application Priority Data

May 27, 2020    (CN) .......................... 202010463865.7

(51) Int. Cl.
*G06N 3/08* (2023.01)
*G06F 18/21* (2023.01)
*G06F 18/214* (2023.01)

(52) U.S. Cl.
CPC .............. *G06N 3/08* (2013.01); *G06F 18/214* (2023.01); *G06F 18/217* (2023.01)

(58) Field of Classification Search
None
See application file for complete search history.

(56) References Cited

U.S. PATENT DOCUMENTS

2018/0239987 A1    8/2018  Chen
2022/0292163 A1 *  9/2022  Huynh .................. G06N 3/045

FOREIGN PATENT DOCUMENTS

| CN | 110674716 | | 1/2020 |
| JP | WO2019138983 A1 * | | 12/2020 |
| JP | 2021058272 A * | | 4/2021 |
| JP | 7103345 B2 * | | 7/2022 |
| TW | 201832138 | | 9/2018 |
| WO | WO 2020006881 A1 * | | 1/2020 |

* cited by examiner

*Primary Examiner* — Fan Zhang
(74) *Attorney, Agent, or Firm* — ScienBiziP, P.C.

(57) ABSTRACT

An image recognition method using reduced processes of calculation acquires training data and trains parameters of fully connected layers of a neural network model with the data. The neural network model is an image recognition model, the training of the parameters of fully connected searches for nodes of at least one connected layer and divides the nodes in a same layer of the into multiple groups according to a first preset rule. A feature node in each of the multiple groups is determined according to a second preset rule and feature node information in each group is used as parameter information to complete the training of the fully connected layer. An image is acquired and input in response to receiving an image recognition command, and an image recognition result is output. A computing device applying the method is also disclosed.

18 Claims, 3 Drawing Sheets

IMAGE RECOGNITION METHOD AND COMPUTING DEVICE

FIELD

The present disclosure relates to a technical field of image recognition, specifically an image recognition method and a computing device.

BACKGROUND

Image recognition technology is applied to many fields. For example, image recognition technology is used to identify bad products on the production line, identify biometric information, and identify vehicle license plate information in case of illegality. Most image recognition methods are based on neural network models, but the neural network models require a large number of calculations, resulting in very slow image recognition.

SUMMARY

An image recognition method and a computing device, which reduce the number of calculations of the neural network model and improve an efficiency of image recognition are disclosed.

A first aspect of the present disclosure provides an image recognition method, the method includes:

acquiring training data and using the training data to train parameters of fully connected layers of a neural network model, the trained neural network model being an image recognition model, wherein the training of the parameters of the fully connected layer of a neural network model includes: searching for nodes of at least one connected layer of the fully connected layers; dividing the nodes in a same layer of the at least one connected layer into multiple groups according to a first preset rule; determining a feature node in each of the multiple groups according to a second preset rule; and using the information of the feature node in each group as parameter information of the fully connected layer to complete the training of the parameters of the fully connected layer;

in response to receiving an image recognition command, acquiring an image to be recognized from the image recognition command;

inputting the image to be recognized in the image recognition model and outputting an image recognition result.

A second aspect of the present disclosure provides a computing device, the computing device includes a memory and a processor, the memory stores at least one computer-readable instruction, and the processor executes the at least one computer-readable instruction to implement the following steps:

acquiring training data and using the training data to train parameters of the fully connected layers of a neural network model, the trained neural network model being an image recognition model, wherein the training of the parameters of the fully connected layer of a neural network model includes: searching for nodes of at least one connected layer of the fully connected layers; dividing the nodes in a same layer of the at least one connected layer into multiple groups according to a first preset rule; determining a feature node in each of the multiple groups according to a second preset rule; and using the information of the feature node in each group as parameter information of the fully connected layer to complete the training of the parameters of the fully connected layer;

in response to receiving an image recognition command, acquiring an image to be recognized from the image recognition command;

inputting the image to be recognized in the image recognition model and outputting an image recognition result.

A third aspect of the present disclosure provides a non-transitory storage medium having stored thereon at least one computer-readable instructions that, when the at least one computer-readable instructions are executed by a processor, implement the following steps:

acquiring training data and using the training data to train parameters of a fully connected layers of a neural network model, the trained neural network model being an image recognition model, wherein the training of the parameters of the fully connected layer of a neural network model includes: searching for nodes of at least one connected layer of the fully connected layers; dividing the nodes in a same layer of the at least one connected layer into multiple groups according to a first preset rule; determining a feature node in each of the multiple groups according to a second preset rule; and using the information of the feature node in each group as parameter information of the fully connected layer to complete the training of the parameters of the fully connected layer;

in response to receiving an image recognition command, acquiring an image to be recognized from the image recognition command;

inputting the image to be recognized in the image recognition model and outputting an image recognition result.

The image recognition method, the computer device, and the storage medium of the present disclosure simplify calculations of the image recognition model, and input the image to be recognized into the simplified calculation structure to obtain the image recognition result, which improves speed and efficiency of image recognition.

DETAILED DESCRIPTION

For clarity of the illustration of objectives, features, and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Optionally, the image recognition method of the present disclosure is applied to one or more computing devices. The computing device includes hardware such as, but not limited to, a microprocessor and an Application Specific Integrated Circuit (ASIC), Field-Programmable Gate Array (FPGA), Digital Signal Processor (DSP), embedded devices, etc.

The computing device may be a device such as a desktop computer, a notebook, a palmtop computer, or a cloud server. The computer device can interact with users through a keyboard, a mouse, a remote control, a touch panel, or a voice control device.

Figure 1:
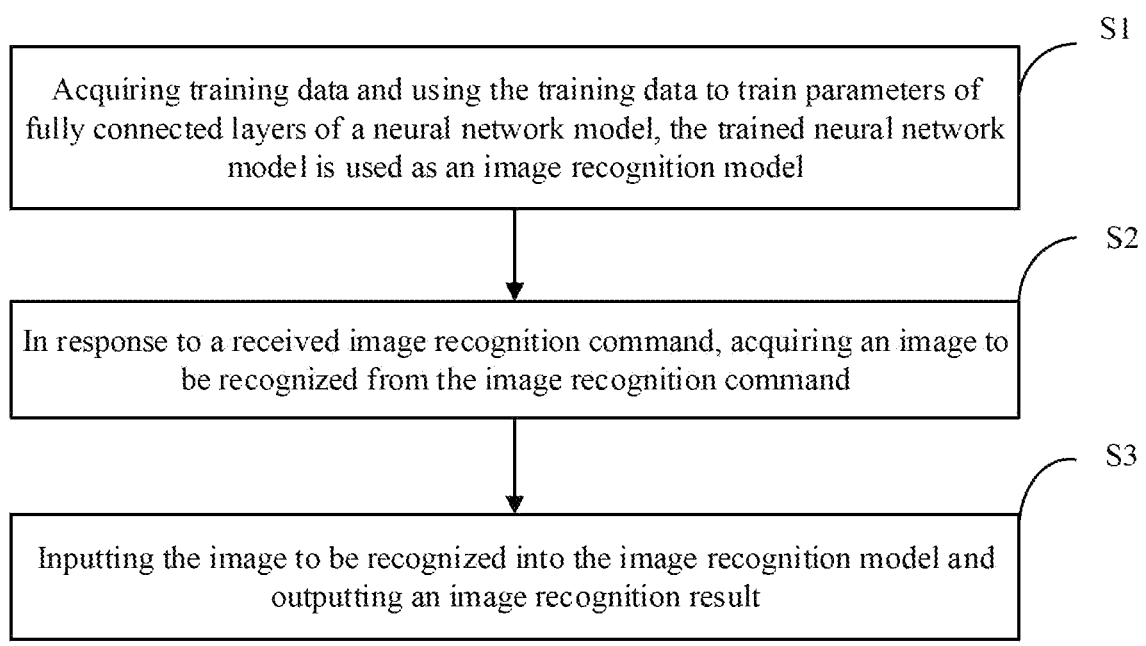
FIG. 1 shows a flowchart of an image recognition method provided in an embodiment of the present disclosure.

FIG. 1 is a flowchart of an image recognition method in an embodiment of the present disclosure. The image recognition method is applied to computing devices. According to different needs, the order of the steps in the flowchart can be changed, and some can be omitted.

In step S1 of the method, acquiring training data and using the training data to train parameters of fully connected layers of a neural network model, the trained neural network model is used as an image recognition model.

The training data can be pictures or videos with known features in the images. For example, it may be a picture of a known product defect type, a photo or video of an object with a known object name, etc.

In some embodiments, the method of training the parameters of a fully connected layer of a neural network model includes:

(1) searching for nodes of at least one connected layer of the fully connected layers.

The neural network model can be a neural network model based on an Alex-Net algorithm or a neural network model based on a VGG16 algorithm.

In some embodiments, the neural network model is a neural network model based on the Alex-Net algorithm. The neural network model includes 5 convolutional layers and 2 fully connected layers.

In other embodiments, a number of layers of the fully connected layer can be adjusted according to a required accuracy of image recognition. The higher the accuracy requirement, the greater must be the number of layers of the fully connected layer. The method of searching for nodes of at least one connected layer of the fully connected layers can include obtain computing programs of the fully connected layers of the neural network model and find nodes of at least one layer in the computing programs of the fully connected layer. For example, computing programs of the fully connected layers of the neural network model based on the Alex-Net algorithm are obtained, and the nodes of a first layer of the fully connected layer and a second layer of the fully connected layer of the neural network model based on the Alex-Net algorithm are respectively searched.

(2) dividing the nodes in a same layer of the at least one connected layer into multiple groups according to a first preset rule.

The computing device finds all nodes in a first layer of the fully connected layer and finds all nodes in a second layer of the fully connected layer in the neural network model based on the Alex-Net algorithm.

Figure 2:
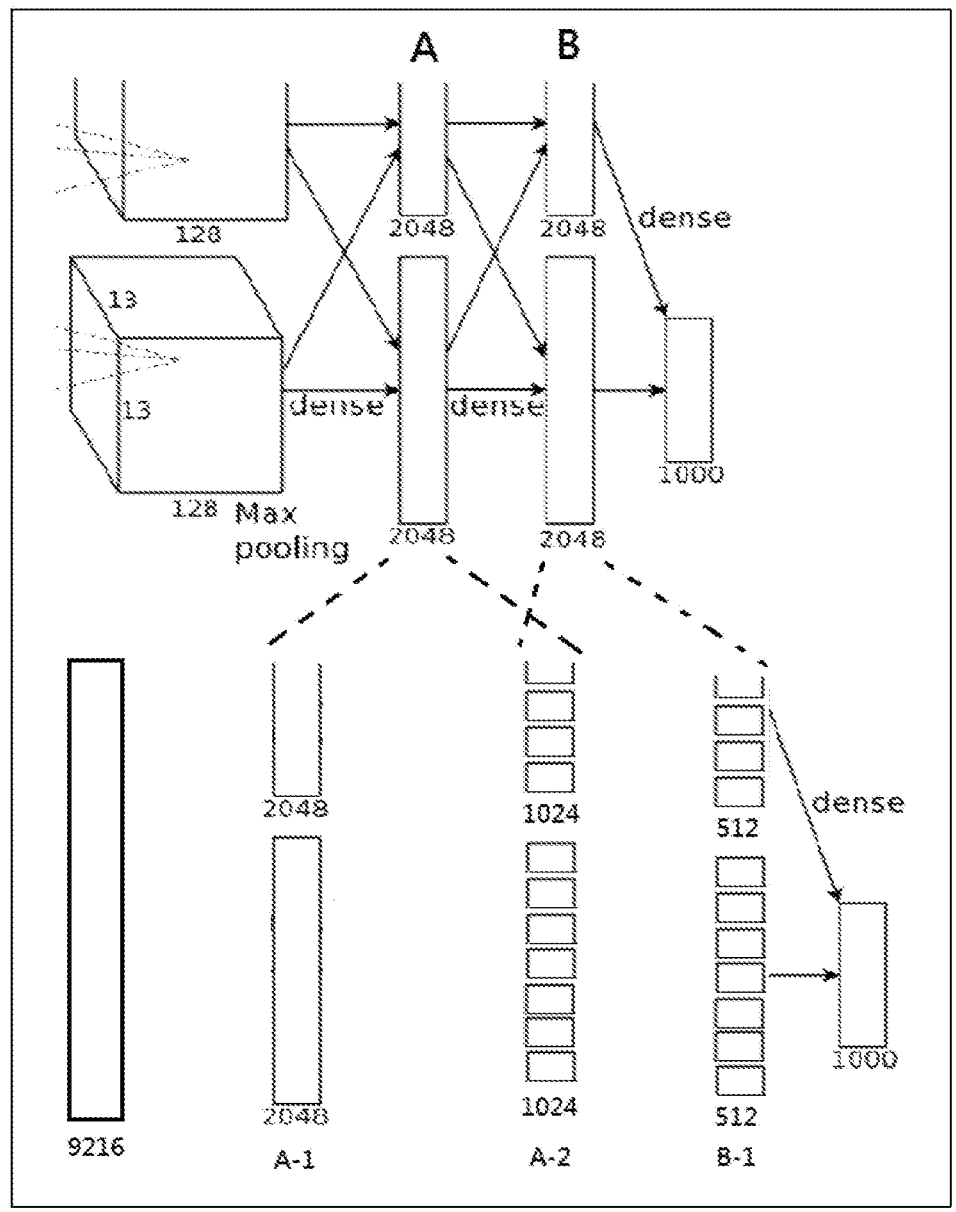
FIG. 2 shows a schematic diagram of a neural network model based on the Alex-Net algorithm provided in an embodiment of the present disclosure.

As shown in FIG. 2, a neural network model based on the Alex-Net algorithm is disclosed in an embodiment of the present disclosure. The layer A in FIG. 2 is used as the first layer of the fully connected layer, and the number of nodes in the first layer is 2048. The training data is connected to the nodes in the first layer of the fully connected layer after operations of the convolutional layer by the ReLU function.

In some embodiments, the method of dividing the nodes in a same layer of the at least one connected layer into multiple groups according to a first preset rule includes:

determining positions and a number of the nodes in the same layer;

grouping the nodes in the same layer evenly according to a preset ratio.

Specifically, two adjacent nodes in the first layer of a fully connected layer can be grouped into a group, or three adjacent nodes in the first layer of a fully connected layer can be grouped into a group. The number of nodes in the same group can be selected according to the calculation speed of the neural network model. The faster the calculation speed of the neural network model, the more nodes there can be in the same group.

In other embodiments, the method of dividing the nodes in a same layer of the at least one connected layer into multiple groups according to a first preset rule includes:

determining positions and a number of the nodes in the same layer;

selecting the nodes at preset positions according to a difference manner, wherein the difference manner includes an equidistant difference and a non-equidistant difference;

grouping the nodes at the preset positions into a first group and grouping nodes at non-preset positions into a second group.

For example, according to the positions of nodes in the fully connected layer of the neural network model, the nodes at the preset positions are divided into groups of two nodes, and the nodes at the non-preset positions are divided into groups of five nodes. This non-equidistant difference method can maximize the number of calculations of the nodes at the preset positions and reduce the number of calculations of the nodes at the non-preset positions, thereby speeding up the calculation of the entire neural network model.

(3) determining a feature node in each of the multiple groups according to a second preset rule.

In some embodiments, the method of determining a feature node in each of the multiple groups according to a second preset rule includes:

obtaining numerical value corresponding to each feature node in each of the multiple groups;

sorting the numerical value;

selecting a node corresponding to a largest value as a feature node in each of the multiple groups.

For example, the value corresponding to the node is the gray value of the pixel in the image, and the corresponding gray value ranges from 0 to 255. The gray value corresponding to each node in the same group is obtained and the gray values are sorted, the node with the largest gray value in the same group is selected as a feature node in the group.

In some embodiments, the method of determining a feature node in each of the multiple groups according to a second preset rule includes:

acquiring a value corresponding to each node in each of the multiple groups;

comparing the value with a second preset threshold;

determining nodes that correspond to the value greater than the second preset threshold as a feature node in each of the multiple groups.

For example, the gray value corresponding to each node in the same group is obtained, and the gray value in the same group is compared with a set threshold. When the gray value is greater than the second preset threshold, the node corresponding to the gray value is determined as a feature node in the group.

(4) using the information of the feature node in each group as parameter information of the fully connected layer to complete the training of the parameters of the fully connected layer.

In some embodiments, the method further includes:

acquiring validation data and using the verification data to verify the trained image recognition model;

calculating accuracy rate of the trained image recognition model according to a verification result;

determining whether the accuracy rate is less than a first preset threshold;

when the accuracy rate is greater than or equal to the first preset threshold, ending the trained image recognition model.

In step S2, in response to a received an image recognition command, acquiring an image to be recognized from the image recognition command.

The image recognition command can be triggered by touching or clicking a preset icon or a preset button on a display interface of the computing device.

The image to be recognized can be uploaded by users or obtained through web crawler technology.

In step S3, inputting the image to be recognized in the image recognition model and outputting an image recognition result.

In some embodiments, the method of inputting the image to be recognized in the image recognition model and outputting an image recognition result includes:

acquiring pixel values of pixels in the image to be recognized and acquiring the parameter information of the fully connected layer in the image recognition model, where the parameter information of the fully connected layer includes an input layer of the fully connected layer, an output layer of the fully connected layer, and the position of the feature node;

finding the position of the feature node in the input layer of the fully connected layer, and converting the pixel values into feature pixel values of the feature node in the input layer of the fully connected layer through a preset first function relationship;

finding the position of the feature node in the output layer of the fully connected layer, and converting the feature pixel values of the feature node in the input layer of the fully connected layer into feature pixel values of the feature node in the output layer of the fully connected layer through a preset second function relationship;

outputting the image recognition result by using the feature pixel values of the feature node in the output layer of the fully connected layer.

In other embodiments, the pixel values of pixels include RGB values and grayscale values. The RGB values or the grayscale values can be input into the image recognition model, and the image recognition result can be output.

FIG. 1 and FIG. 2 above describe the image recognition method of the present disclosure in detail. The following describes the functional modules of the software device that implements the image recognition method and the hardware device architecture that implements the image recognition method in conjunction with FIGS. 3-4.

FIG. 2 shows a schematic structural diagram of an image recognition device provided in the embodiment of the present disclosure. As shown in FIG. 2, the image recognition device 10 can include: a training module 101, an acquisition module 102, and an output module 103.

The training module 101 acquires training data and uses the training data to train parameters of fully connected layers of a neural network model. The trained neural network model is used as an image recognition model.

The training data can be pictures or videos with known features in the images. For example, it may be a picture of a known product defect type, a photo or video of an object with a known object name, etc.

In some embodiments, the method of training the parameters of a fully connected layer of a neural network model includes:

(1) searching for nodes of at least one connected layer of the fully connected layers.

The neural network model can be a neural network model based on an Alex-Net algorithm or a neural network model based on a VGG16 algorithm.

In some embodiments, the neural network model is a neural network model based on the Alex-Net algorithm. The neural network model includes 5 convolutional layers and 2 fully connected layers.

In other embodiments, a number of layers of the fully connected layer can be adjusted according to a required accuracy of image recognition. The higher the accuracy requirement of the image recognition, the greater must be the number of layers of the fully connected layer. The method of searching for nodes of at least one connected layer of the fully connected layers can include obtain computing programs of the fully connected layers of the neural network model and find nodes of at least one layer in the computing programs of the fully connected layer. For example, computing programs of the fully connected layers of the neural network model based on the Alex-Net algorithm are obtained, and the nodes of a first layer of the fully connected layer and a second layer of the fully connected layer of the neural network model based on the Alex-Net algorithm are respectively searched.

(2) dividing the nodes in a same layer of the at least one connected layer into multiple groups according to a first preset rule.

The computing device finds all nodes in a first layer of the fully connected layer and finds all nodes in a second layer of the fully connected layer in the neural network model based on the Alex-Net algorithm.

As shown in FIG. 2, a neural network model based on the Alex-Net algorithm is disclosed in an embodiment. The layer A in FIG. 2 is used as the first layer of the fully connected layer, and the number of nodes in the first layer is 2048. The training data is connected to the nodes in the first layer of the fully connected layer after operations of the convolutional layer by the ReLU function.

In some embodiments, the method of dividing the nodes in a same layer of the at least one connected layer into multiple groups according to a first preset rule includes:

determining positions and a number of the nodes in the same layer;

grouping the nodes in the same layer evenly according to a preset ratio.

Specifically, two adjacent nodes in the first layer of a fully connected layer can be grouped into a group, or three adjacent nodes in the first layer of a fully connected layer can be grouped into a group. The number of nodes in the same group can be selected according to the calculation speed of the neural network model. The faster the calculation speed of the neural network model, the more nodes there can be in the same group.

In other embodiments, the method of dividing the nodes in a same layer of the at least one connected layer into multiple groups according to a first preset rule includes:

determining positions and a number of the nodes in the same layer;

selecting the nodes at preset positions according to a difference manner, wherein the difference manner includes an equidistant difference and a non-equidistant difference;

grouping the nodes at the preset positions into a first group and grouping nodes at non-preset positions into a second group.

For example, according to the positions of nodes in the fully connected layer of the neural network model, the nodes at the preset positions are divided into groups of two nodes, and the nodes at the non-preset positions are divided into groups of five nodes. This non-equidistant difference method can maximize the number of calculations of the nodes at the preset positions and reduce the number of calculations of the nodes at the non-preset positions, thereby speeding up the calculation of the entire neural network model.

(3) determining a feature node in each of the multiple groups according to a second preset rule.

In some embodiments, the method of determining a feature node in each of the multiple groups according to a second preset rule includes:

obtaining numerical value corresponding to each feature node in each of the multiple groups;

sorting the numerical value;

selecting a node corresponding to a largest value as a feature node in each of the multiple groups.

For example, the value corresponding to the node is the gray value of the pixel in the image, and the corresponding gray value ranges from 0 to 255. The gray value corresponding to each node in the same group is obtained and the gray values are sorted, the node with the largest gray value in the same group is selected as a feature node in the group.

In some embodiments, the method of determining a feature node in each of the multiple groups according to a second preset rule includes:

acquiring a value corresponding to each node in each of the multiple groups;

comparing the value with a second preset threshold;

determining nodes that correspond to the value greater than the second preset threshold as a feature node in each of the multiple groups.

For example, the gray value corresponding to each node in the same group is obtained, and the gray value in the same group is compared with a set threshold. When the gray value is greater than the second preset threshold, the node corresponding to the gray value is determined as a feature node in the group.

(4) using the information of the feature node in each group as parameter information of the fully connected layer to complete the training of the parameters of the fully connected layer.

In some embodiments, the method further includes:

acquiring validation data and using the verification data to verify the trained image recognition model;

calculating accuracy rate of the trained image recognition model according to a verification result;

determining whether the accuracy rate is less than a first preset threshold;

when the accuracy rate is greater than or equal to the first preset threshold, ending the trained image recognition model.

The acquisition module 102, in response to receiving an image recognition command, acquires an image to be recognized.

The image recognition command can be triggered by touching or clicking a preset icon or a preset button on a display interface of the computing device.

The image to be recognized can be uploaded by users or obtained through web crawler technology.

The output module 103 inputs the image to be recognized into the image recognition model and outputs an image recognition result.

In some embodiments, the method of inputting the image to be recognized in the image recognition model and outputting an image recognition result includes:

acquiring pixel values of pixels in the image to be recognized and acquiring the parameter information of the fully connected layer in the image recognition model, where the parameter information of the fully connected layer includes an input layer of the fully connected layer, an output layer of the fully connected layer, and the position of the feature node;

finding the position of the feature node in the input layer of the fully connected layer, and converting the pixel values into feature pixel values of the feature node in the input layer of the fully connected layer through a preset first function relationship;

finding the position of the feature node in the output layer of the fully connected layer, and converting the feature pixel values of the feature node in the input layer of the fully connected layer into feature pixel values of the feature node in the output layer of the fully connected layer through a preset second function relationship;

outputting the image recognition result by using the feature pixel values of the feature node in the output layer of the fully connected layer.

In other embodiments, the pixel values of pixels include RGB values and grayscale values. The RGB values or the grayscale values can be input into the image recognition model, and the image recognition result can be output.

The embodiment provides a non-transitory readable storage medium having computer-readable instructions stored on thereof. The computer-readable instructions are executed by a processor to implement the steps in the above-mentioned image recognition method, such as in steps S1-S3 shown in FIG. 1:

In step S1, acquiring training data and using the training data to train parameters of fully connected layers of a neural network model, and the trained neural network model is used as an image recognition model;

In step S2, in response to receiving an image recognition command, acquiring an image to be recognized from the image recognition command;

In step S3, inputting the image to be recognized in the image recognition model and outputting an image recognition result.

Or, the computer-readable instruction is executed by the processor to realize the functions of each module/unit in the above-mentioned device embodiments, such as the units 101-103 in FIG. 2:

The training module 101 acquires training data and uses the training data to train parameters of fully connected layers of a neural network model, and the trained neural network model is used as an image recognition model;

The acquisition module 102, in response to receiving an image recognition command, acquires an image to be recognized;

The output module 103 inputs the image to be recognized into the image recognition model and outputs an image recognition result.

Figure 3:
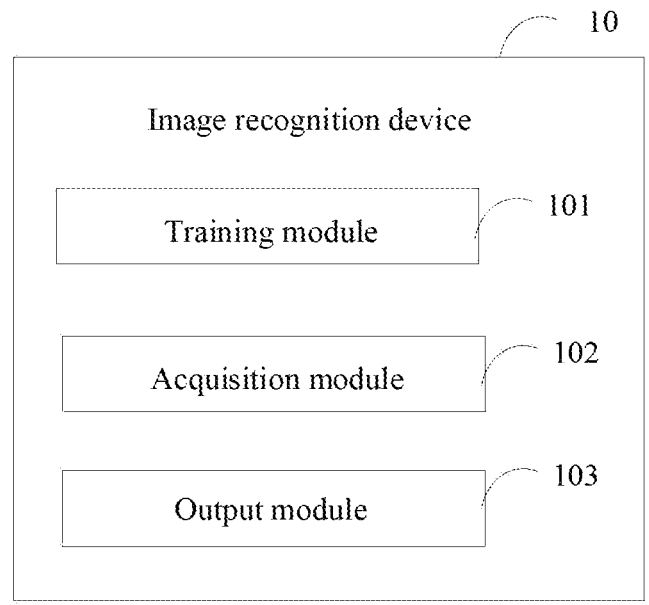
FIG. 3 shows a schematic structural diagram of an image recognition device provided in an embodiment of the present disclosure.
Figure 4:
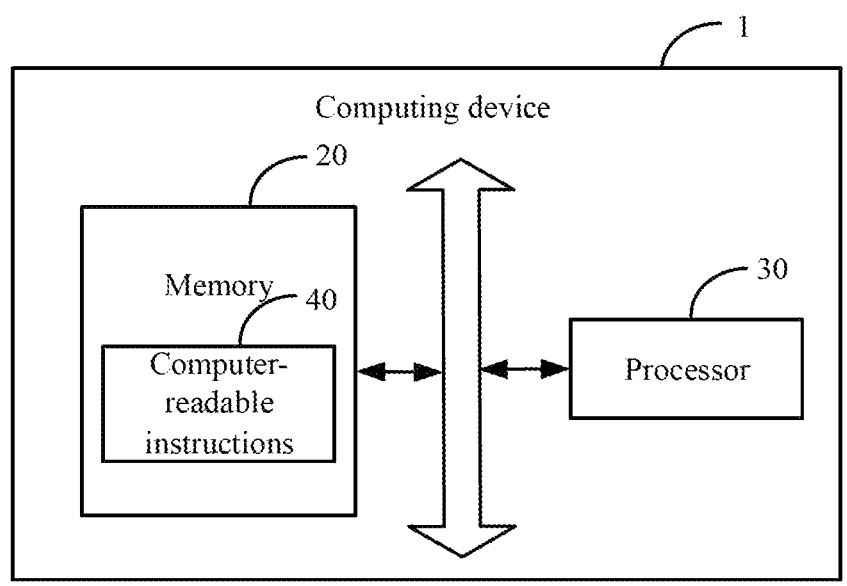
FIG. 4 shows a schematic structural diagram of a computing device provided in an embodiment of the present disclosure.

FIG. 3 is a schematic structural diagram of a computing device provided in Embodiment four of the present disclosure. The computing device 1 may include: a memory 20, at least one processor 30, and computer-readable instructions 40 stored in the memory 20 and executable on the at least one processor 30, for example, image recognition programs. The processor 30 executes the computer-readable instructions 40 to implement the steps in the embodiment of the image recognition method, such as in steps S1-S3 shown in FIG. 1. Alternatively, the processor 30 executes the computer-readable instructions 40 to implement the functions of the modules/units in the foregoing device embodiments, such as the units 101-103 in FIG. 2.

Exemplarily, the computer-readable instructions 40 can be divided into one or more modules/units, and the one or more modules/units are stored in the memory 20 and executed by the at least one processor 30. The one or more modules/units can be a series of computer-readable instruction segments capable of performing specific functions, and the instruction segments are used to describe execution processes of the computer-readable instructions 40 in the computing device 1. For example, The computer-readable instruction 40 can be divided into the training module 101, the acquisition module 102, the output module 103 as in FIG. 2.

The computing device 1 can be a computing device such as a desktop computer, a notebook, a palmtop computer, and a cloud server. Those skilled in the art will understand that the schematic diagram 3 is only an example of the computing device 1 and does not constitute a limitation on the computing device 1. Another computing device 1 may include more or fewer components than shown in the figures or combine some components or have different components. For example, the computing device 1 may further include an input/output device, a network access device, a bus, and the like.

The at least one processor 30 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 30 can be a microprocessor or any conventional processor. The processor 30 is a control center of the computing device 1 and connects various parts of the entire computing device 1 by using various interfaces and lines.

The memory 20 can be configured to store the computer-readable instructions 40 and/or modules/units. The processor 30 may run or execute the computer-readable instructions and/or modules/units stored in the memory 20 and may call up data stored in the memory 20 to implement various functions of the computing device 1. The memory 20 mainly includes a storage program area and a storage data area. The storage program area may store an operating system, and an application program required for at least one function (such as a sound playback function, an image playback function, etc.), etc. The storage data area may store data (such as audio data, a phone book, etc.) created according to the use of the computing device 1. In addition, the memory 20 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the computing device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset application, it should be understood that the disclosed computing device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. An image recognition method, the method comprising:
acquiring training data and using the training data to train parameters of fully connected layers of a neural network model, the trained neural network model being an image recognition model, wherein the training of the parameters of the fully connected layer of a neural network model comprises: searching for nodes of at least one connected layer of the fully connected layers; dividing the nodes in a same layer of the at least one connected layer into multiple groups according to a first preset rule; obtaining numerical value corresponding to each feature node in each of the multiple groups; sorting the numerical value; selecting a node corresponding to a largest value as a feature node in each of the multiple groups; and using the information of the feature node in each group as parameter information of the fully connected layer to complete the training of the parameters of the fully connected layer;
in response to receiving an image recognition command, acquiring an image to be recognized from the image recognition command;
inputting the image to be recognized in the image recognition model and outputting an image recognition result.

2. The image recognition method according to claim 1, further comprising:
acquiring validation data and using the verification data to verify the trained image recognition model;
calculating accuracy rate of the trained image recognition model according to a verification result;
determining whether the accuracy rate is less than a first preset threshold;
when the accuracy rate is greater than or equal to the first preset threshold, ending the trained image recognition model.

3. The image recognition method of claim 1, wherein the step of dividing the nodes in a same layer of the at least one connected layer into multiple groups according to a first preset rule comprises:
determining positions and a number of the nodes in the same layer;
grouping the nodes in the same layer evenly according to a preset ratio.

4. The image recognition method of claim 1, wherein the step of dividing the nodes in a same layer of the at least one connected layer into multiple groups according to a first preset rule comprises:
determining positions and a number of the nodes in the same layer;
selecting the nodes at preset positions according to a difference manner, wherein the difference manner comprises an equidistant difference and a non-equidistant difference;
grouping the nodes at the preset positions into a first group and grouping nodes at non-preset positions into a second group.

5. The image recognition method according to claim 1, wherein the step of determining a feature node in each of the multiple groups according to a second preset rule comprises:
acquiring a value corresponding to each node in each of the multiple groups;
comparing the value with a second preset threshold;
determining nodes that correspond to the value greater than the second preset threshold as a feature node in each of the multiple groups.

6. The image recognition method according to claim 1, wherein the step of inputting the image to be recognized in the image recognition model and outputting an image recognition result comprises:
acquiring pixel values of pixels in the image to be recognized and acquiring the parameter information of the fully connected layer in the image recognition model, where the parameter information of the fully connected layer comprises an input layer of the fully connected layer, an output layer of the fully connected layer, and the position of the feature node;
finding the position of the feature node in the input layer of the fully connected layer, and converting the pixel values into feature pixel values of the feature node in the input layer of the fully connected layer through a preset first function relationship;
finding the position of the feature node in the output layer of the fully connected layer, and converting the feature pixel values of the feature node in the input layer of the fully connected layer into feature pixel values of the feature node in the output layer of the fully connected layer through a preset second function relationship;
outputting the image recognition result by using the feature pixel values of the feature node in the output layer of the fully connected layer.

7. A computing device comprising a memory and a processor, the memory stores at least one computer-readable instruction, and the processor executes the at least one computer-readable instruction to implement the following steps:
acquiring training data and using the training data to train parameters of fully connected layers of a neural network model, the trained neural network model being an image recognition model, wherein the training of the parameters of the fully connected layer of a neural network model comprises: searching for nodes of at least one connected layer of the fully connected layers; dividing the nodes in a same layer of the at least one connected layer into multiple groups according to a first preset rule; obtaining numerical value corresponding to each feature node in each of the multiple groups; sorting the numerical value; selecting a node corresponding to a largest value as a feature node in each of the multiple groups; and using the information of the feature node in each group as parameter information of the fully connected layer to complete the training of the parameters of the fully connected layer;
in response to receiving an image recognition command, acquiring an image to be recognized from the image recognition command;
inputting the image to be recognized in the image recognition model and outputting an image recognition result.

8. The computing device according to claim 7, further comprising:
acquiring validation data and using the verification data to verify the trained image recognition model;
calculating accuracy rate of the trained image recognition model according to a verification result;
determining whether the accuracy rate is less than a first preset threshold;
when the accuracy rate is greater than or equal to the first preset threshold, ending the trained image recognition model.

9. The computing device of claim 7, wherein the step of dividing the nodes in a same layer of the at least one connected layer into multiple groups according to a first preset rule comprises:
determining positions and a number of the nodes in the same layer;
grouping the nodes in the same layer evenly according to a preset ratio.

10. The computing device of claim 7, wherein the step of dividing the nodes in a same layer of the at least one connected layer into multiple groups according to a first preset rule comprises:
determining positions and a number of the nodes in the same layer;
selecting the nodes at preset positions according to a difference manner, wherein the difference manner comprises an equidistant difference and a non-equidistant difference;
grouping the nodes at the preset positions into a first group and grouping nodes at non-preset positions into a second group.

11. The computing device of claim 7, wherein the step of determining a feature node in each of the multiple groups according to a second preset rule comprises:
acquiring a value corresponding to each node in each of the multiple groups;
comparing the value with a second preset threshold;
determining nodes that correspond to the value greater than the second preset threshold as a feature node in each of the multiple groups.

12. The computing device of claim 7, wherein the step of inputting the image to be recognized in the image recognition model and outputting an image recognition result comprises:
acquiring pixel values of pixels in the image to be recognized and acquiring the parameter information of the fully connected layer in the image recognition model, where the parameter information of the fully connected layer comprises an input layer of the fully connected layer, an output layer of the fully connected layer, and the position of the feature node;
finding the position of the feature node in the input layer of the fully connected layer, and converting the pixel values into feature pixel values of the feature node in the input layer of the fully connected layer through a preset first function relationship;
finding the position of the feature node in the output layer of the fully connected layer, and converting the feature pixel values of the feature node in the input layer of the fully connected layer into feature pixel values of the feature node in the output layer of the fully connected layer through a preset second function relationship;
outputting the image recognition result by using the feature pixel values of the feature node in the output layer of the fully connected layer.

13. A non-transitory storage medium having stored thereon at least one computer-readable instructions that, when the at least one computer-readable instructions are executed by a processor to implement the following steps:
acquiring training data and using the training data to train parameters of fully connected layers of a neural network model, the trained neural network model being an image recognition model, wherein the training of the parameters of the fully connected layer of a neural network model comprises: searching for nodes of at least one connected layer of the fully connected layers; dividing the nodes in a same layer of the at least one connected layer into multiple groups according to a first preset rule; obtaining numerical value corresponding to each feature node in each of the multiple groups; sorting the numerical value; selecting a node corresponding to a largest value as a feature node in each of the multiple groups; and using the information of the feature node in each group as parameter information of the fully connected layer to complete the training of the parameters of the fully connected layer;
in response to receiving an image recognition command, acquiring an image to be recognized from the image recognition command;
inputting the image to be recognized in the image recognition model and outputting an image recognition result.

14. The non-transitory storage medium according to claim 13, further comprising:
acquiring validation data and using the verification data to verify the trained image recognition model;
calculating accuracy rate of the trained image recognition model according to a verification result;
determining whether the accuracy rate is less than a first preset threshold;
when the accuracy rate is greater than or equal to the first preset threshold, ending the trained image recognition model.

15. The non-transitory storage medium according to claim 13, wherein the step of dividing the nodes in a same layer of the at least one connected layer into multiple groups according to a first preset rule comprises:
determining positions and a number of the nodes in the same layer;
grouping the nodes in the same layer evenly according to a preset ratio.

16. The non-transitory storage medium according to claim 13, wherein the step of dividing the nodes in a same layer of the at least one connected layer into multiple groups according to a first preset rule comprises:
determining positions and a number of the nodes in the same layer;
selecting the nodes at preset positions according to a difference manner, wherein the difference manner comprises an equidistant difference and a non-equidistant difference;
grouping the nodes at the preset positions into a first group and grouping nodes at non-preset positions into a second group.

17. The non-transitory storage medium according to claim 13, wherein the step of determining a feature node in each of the multiple groups according to a second preset rule comprises:
acquiring a value corresponding to each node in each of the multiple groups; comparing the value with a second preset threshold; determining nodes that correspond to the value greater than the second preset threshold as a feature node in each of the multiple groups.

18. The non-transitory storage medium according to claim 13, wherein the step of inputting the image to be recognized in the image recognition model and outputting an image recognition result comprises:
acquiring pixel values of pixels in the image to be recognized and acquiring the parameter information of the fully connected layer in the image recognition model, where the parameter information of the fully connected layer comprises an input layer of the fully connected layer, an output layer of the fully connected layer, and the position of the feature node;

finding the position of the feature node in the input layer of the fully connected layer, and converting the pixel values into feature pixel values of the feature node in the input layer of the fully connected layer through a preset first function relationship;

finding the position of the feature node in the output layer of the fully connected layer, and converting the feature pixel values of the feature node in the input layer of the fully connected layer into feature pixel values of the feature node in the output layer of the fully connected layer through a preset second function relationship;

outputting the image recognition result by using the feature pixel values of the feature node in the output layer of the fully connected layer.

\* \* \* \* \*